United States Patent [19]

Takashima

[11] 4,321,035

[45] Mar. 23, 1982

[54] HEAT-INSULATING CONSTRUCTION

[75] Inventor: Masaru Takashima, Komae, Japan

[73] Assignee: Aikoh Co., Ltd., Tokyo, Japan

[21] Appl. No.: 128,044

[22] Filed: Mar. 7, 1980

[30] Foreign Application Priority Data

Nov. 9, 1979 [JP] Japan ................................ 54-154781

[51] Int. Cl.[3] ........................ B32B 9/00; B32B 15/04; F27D 1/18

[52] U.S. Cl. .................................... 432/250; 266/280; 266/286; 428/35; 428/457; 428/472; 428/920

[58] Field of Search ................. 428/35, 367, 365, 457, 428/472, 538, 913, 920; 174/188, 189, 186; 222/597, 602; 366/347; 432/250, 247; 110/336; 266/280, 286

[56] References Cited

U.S. PATENT DOCUMENTS

| | | | |
|---|---|---|---|
| 3,770,557 | 11/1973 | Habeeb et al. | 428/472 X |
| 4,059,398 | 11/1977 | Zimmer et al. | 432/247 |
| 4,167,598 | 9/1979 | Logan et al. | 428/35 |

*Primary Examiner*—Lorraine T. Kendell

*Attorney, Agent, or Firm*—Maky, Renner, Otto & Boisselle

[57] ABSTRACT

A heat-insulating construction comprising a sealed empty chamber in which the external lower surface consists of a reflective surface, and a refractory fiber layer connecting to the lower side of said chamber.

10 Claims, 3 Drawing Figures

HEAT-INSULATING CONSTRUCTION

This invention relates to an improvement in a heat-insulating construction.

Shield of high-temperature chambers such as furnace and fire chamber and molten metals in vessels such as ladle and tundish are cooled by external air whereby said shield causes a heat loss and the temperatures of the metals are lowered. Not only a heat-insulating construction requires a heat-insulation by means of wall and ceiling structures, but also members such as cover and door which require mobility must be of light weight. Conventionally, there has been used a construction made of steel plate and having the inner surface lined with a refractory material. Due to bad heat insulation of the refractory, however, sufficient heat insulation cannot be obtained unless the construction has a considerable thickness. This necessarily increases the weight of construction thereby uneconomically needing a large power for moving or lifting the door. To solve this problem, attempts have been made in which steel sheets in place of refractory material are fitted, at intervals, to the inside of the cover in one or more layers thereby to form empty chamber in a single or plural stages. However, the steel sheets are deformed due to the radiant heat from the molten metal surface or damaged by the deformation so that these attempts have not been in practical use.

The present invention has succeeded in increasing heat insulation and durability by eliminating said drawbacks of the conventional heat-insulating construction.

The construction of the invention will be described more in detail with reference to the accompanying drawings in which.

There are provided a sealed empty chamber 1 in which the external lower surface forms a reflective surface 3, and a refractory fiber layer 2 at the lower side of said empty chamber 1. For example, the radiant heat is shielded from the molten steel surface to the refractory fiber layer 2, the radiant rays passed through the layer 2 is reflectively shielded at said reflective surface 3, and then the heat heated at said surface 3 is prevented as much as possible from escaping to the outside by low heat-transferring air in the sealed empty chamber 1. Further, to shield the radiant heat better, the reflective surface may also be disposed at least at a part of the inner surface of said sealed empty chamber 1 such as at an internal ceiling 7, and plate or foil having a reflective surface is provided at the middle or the lower surface of said refractory fiber layer 2, when the heat is more effectively prevented.

Figure 1:
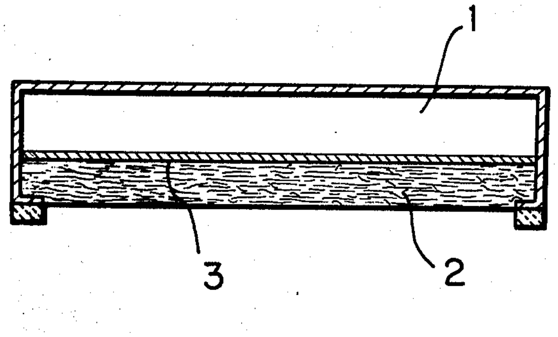
FIG. 1 is a sectional view of one example of the invention.
Figure 3:
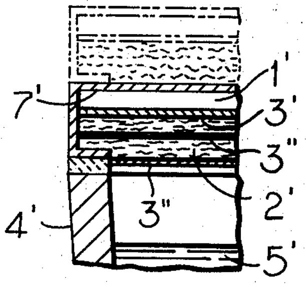
FIG. 3 is a fragmentary sectional view showing another example of the invention.

Further, there may be more than one sealed empty chamber 1 and refractory fiber layer 2, such being alternately arranged in the cover as illustrated in solid and phantom lines in FIG. 3, wherein primed and double primed reference numerals designate elements corresponding generally to those identified herein by the same but unprimed reference numerals. The example seen in FIG. 3 also illustrates the above-mentioned optional and alternative positions of the reflective surface in or at the lower surface of the refractory fiber layer. As shown, a plate or foil having a reflective surface 3″ may be provided at the middle or the lower surface of the refractory fiber layer 2′.

It is most economical to assemble the sealed empty chamber 1 with thin steel sheet, and the lower surface of said chamber is polished or plated with a lustrous metal such as chromium, nickel, tin or aluminium. If the lower surface has a reflectance higher than 80% it will answer the purpose. The empty chamber may be sealed in such an extent that the inside of the chamber is capable of checking the entry of external air when the cover is used.

Preferably the refractory fiber layer 2 is as high in refractoriness as possible as refractory fiber, but a fiber having refractory properties same as a kaolin fiber will suffice. Small amounts of highly refractory fibers such as carbon fiber, silicon carbide fiber, alumina fiber and magnesia fiber may be added for reinforcement to the refractory fiber layer, or the surface close to the melt surface may be partially made of a layer of said highly refractory fibers. Reversely, a part or the whole of said highly refractory fibers may be replaced by low refractory fibers such as asbestos, rock wool, glass wool and slag wool according to desired heat resistancy, and it is economically advantageous that the surface near the melt surface is made to be of high refractoriness, and the back surface is formed a layer of said low refractory fibers. If the refractory fibers are coarse so as to form too many voids in the formed layer and there is a fear that the radiant rays might excessively pass through the voids, said voids between the fibers may be filled with a refractory powder mixed with a binder.

As example of the invention will now be described. A molten metal at 1,580° C. is charged into a 300 ton ladle. As a cover for the ladle there is prepared a sealed empty chamber made of a steel plate of 0.4 mm thick, said chamber having a 3,500 mm outside diameter and a 100 mm height, and the external lower surface of said chamber is plated with aluminium. A kaolin fiber felt (of 0.15 bulk specific gravity) is attached to the lower surface to form a 80 mm thickness. The outside is encircled with a 0.4 mm thick steel plate same as the external plate of said sealed empty chamber, and the circumferential flange of the lower surface is applied, over a 100 mm width thereof, with a 0.4 mm flange thereby to prevent the refractory fiber felt from releasing. Further, the refractory fiber felt and the ceiling portion of said sealed empty chamber are clamped and fastened, at 300 mm intervals, by means of bolts of 10 mm$\phi$ × 200 mm long.

Figure 2:
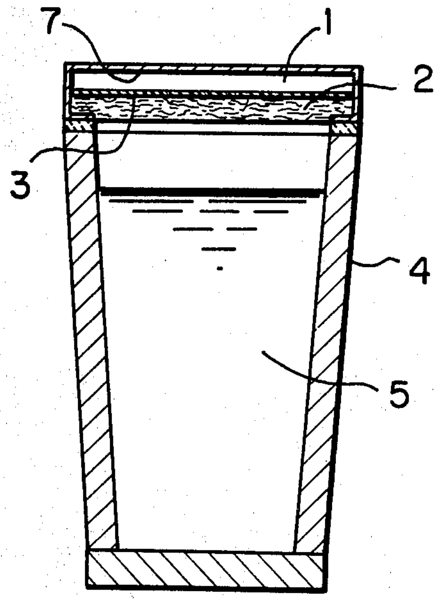
FIG. 2 is a sectional view showing an example in which the heat-insulating construction of the invention is applied to a steel ingot making.

As external reinforcing member, steel pipes each having an outer diameter of 31.8 mm and a thickness of 1.2 mm are radially disposed with 45° gaps between the refractory fiber felt and the ceiling portion from the center. The same steel pipes are bridged on the upper surface in a concentric arrangement dividing the radius into three equilibrium sections, and the pipes thus radially arranged are bent downwardly around the outer circumference until they are wound down to the flange of the lower surface thereby to secure the main body of said cover. As seen in FIG. 2, a cover thus prepared is then placed on an annular cushion made of the refractory fiber and placed on the flange of the ladle 4, being positioned at a 1.5 m distance from the surface of the molten steel 5. After 20 minutes the temperature at the upper surface of the cover was 45° C. but it was never raised higher. This means that the heat radiation of the ladle came close to the minimum, substantially equal to the temperature at the side surface of the ladle.

The maximum total weight of the cover used the example was 390 kg and the cover was very convenient to stand 1,000 uses.

The heat-insulating construction according to the invention can be applied not only to the molten metal vessel referred to above but also to a molten metal runner. If the construction is of small size the cover can be used for a lid of dipper with handle. Anyhow, the cover is effective as lightweight cover having good heat-insulating properties.

Moreover, the construction of the invention can be effectively used for preventing cooling of a converter throat during intermediate non-operation, for improving efficiency of a boiler fire chamber thanks to heat retention, or for door of an equalizer furnace, cover of a soaking pit, other high heat chambers requiring heat insulation, and chambers accommodating hot articles.

What is claimed is:

1. A cover for use with a high temperature chamber comprising a sealed insulating chamber having a heat reflective lower outer surface for reflecting radiant heat energy back towards the interior of the high temperature chamber, and refractory fiber layer means connected to said sealed insulating chamber at said reflective lower surface thereof for shielding said sealed insulating chamber from the interior of the high temperature chamber.

2. The cover of claim 1 including another heat reflective surface located internally of said sealed insulating chamber.

3. The cover of claim 2 wherein said another heat reflective surface is the internal ceiling surface of said sealed insulating chamber.

4. The cover of claim 1 wherein said heat reflective lower outer surface is polished or plated.

5. The cover of claim 1 including another heat reflective surface located within said refractory fiber layer means.

6. The cover of claim 1 including another heat reflective surface located at the lower surface of said refractory fiber layer means.

7. The cover of claims 5 or 6 wherein said another heat reflective surface is on a plate.

8. The cover of claims 5 or 6 wherein said another heat reflective surface is on foil.

9. The cover of claim 2 further comprising still another heat reflective surface located within said refractory fiber layer means.

10. The cover of claim 1 wherein there are plural sealed insulating chambers and refractory fiber layer means that are alternately arranged in said cover.

* * * * *